US008605897B2

United States Patent
Golic

(10) Patent No.: US 8,605,897 B2
(45) Date of Patent: Dec. 10, 2013

(54) SYMMETRIC-KEY ENCRYPTION METHOD AND CRYPTOGRAPHIC SYSTEM EMPLOYING THE METHOD

(75) Inventor: Jovan Golic, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 13/387,377

(22) PCT Filed: Jul. 28, 2009

(86) PCT No.: PCT/IT2009/000333
§ 371 (c)(1),
(2), (4) Date: Jan. 27, 2012

(87) PCT Pub. No.: WO2011/013148
PCT Pub. Date: Feb. 3, 2011

(65) Prior Publication Data
US 2012/0128153 A1      May 24, 2012

(51) Int. Cl.
*G06F 21/00*      (2013.01)
(52) U.S. Cl.
USPC .......................................................... 380/44
(58) Field of Classification Search
USPC ...................... 380/45, 44; 713/150, 165, 167
See application file for complete search history.

(56) References Cited

U.S. PATENT DOCUMENTS

| | | | |
|---|---|---|---|
| 7,177,424 B1 * | 2/2007 | Furuya et al. | 380/37 |
| 7,751,565 B2 * | 7/2010 | Yuen | 380/255 |
| 2005/0213752 A1 * | 9/2005 | Hawkes et al. | 380/28 |
| 2006/0227965 A1 * | 10/2006 | Zhu et al. | 380/37 |
| 2007/0253549 A1 | 11/2007 | Celikkan et al. | |
| 2008/0170693 A1 | 7/2008 | Spies et al. | |
| 2008/0310624 A1 * | 12/2008 | Celikkan et al. | 380/29 |

FOREIGN PATENT DOCUMENTS

WO      WO 2007/118829 A1      10/2007

OTHER PUBLICATIONS

Jovan Dj. Golic: "Modes of Operation of Stream Ciphers," Proceedings of Selected Areas in Cryptography—SAC 2000, Lecture Notes in Computer Science, vol. 2012, pp. 233-247 (2001).
International Search Report in International Application No. PCT/IT2009/000333; Mailing Date: Apr. 9, 2010.

* cited by examiner

*Primary Examiner* — Ali Abyaneh
(74) *Attorney, Agent, or Firm* — Finnegan, Henderson, Farabow, Garrett & Dunner, L.L.P.

(57) ABSTRACT

Symmetric-key encryption method for transforming a sequence of plaintext symbols into a sequence of ciphertext symbols, includes an iterative encryption process including: computing an altered current internal state by combining a current internal state with a current memory symbol; computing a next internal state from the altered current internal state; generating a keystream symbol from the next internal state; verifying whether the generated keystream symbol satisfies a condition related to data-format/syntax rules; iteratively computing next internal states and iteratively generating keystream symbols; and iteratively encrypting plaintext symbols by employing next keystream symbols to obtain the sequence of ciphertext symbols.

21 Claims, 5 Drawing Sheets

SYMMETRIC-KEY ENCRYPTION METHOD AND CRYPTOGRAPHIC SYSTEM EMPLOYING THE METHOD

CROSS REFERENCE TO RELATED APPLICATION

This application is a national phase application based on PCT/IT2009/000333, filed Jul. 28, 2009, the content of which is incorporated herein by reference.

TECHNICAL FIELD OF THE INVENTION

The present invention relates to cryptography and particularly to encryption algorithms able of preserving the format and syntax specifications of digital data to be protected.

BACKGROUND OF THE INVENTION

Encryption techniques are used to provide confidentiality of sensitive data to be transmitted over insecure communications channels or to be stored in insecure computer systems or publicly accessible databases. An encryption algorithm reversibly transforms plaintext into ciphertext data which can be transformed back to the original form by a decryption algorithm only by the authorized entities in a possession of the corresponding cryptographic key, which needs to be kept secret. A symmetric-key encryption algorithm, such as a block or stream cipher, uses the same key for encryption and decryption.

As it is known, block ciphers operate on fixed-size blocks of data symbols on the block-by-block basis, whereas stream ciphers operate on variable-length sequences of data symbols on the symbol-by-symbol basis. According to the prior art techniques, block ciphers can be used in the so-called Electronic Code Book (ECB) encryption mode by encrypting the plaintext data repeatedly by the same key.

Conventional stream ciphers do not show satisfying security performances if they are used in the ECB mode and hence require a new Initialization Vector (IV) for each new encryption by the same key. The secret key and IV are combined together by an initialization algorithm prior to the encryption. Such IV's need to be transmitted or stored together with the encrypted data, but do not have to be kept secret.

In common data processing systems, to avoid compatibility problems related to various applications, it is necessary to preserve the data format when all or selected data are encrypted. To the purposes of the present invention, for data expressed as a sequence of data symbols, the data format is defined in terms of the sequence length and the (finite) alphabets to which individual symbols belong. As an example, for alphanumeric data, particular symbols, depending on a position in a data sequence, can be numeric or may correspond to alphabet letters or may be mixed. The preserved data format thus means that the output and input data sequences have the same number of symbols and that, for each position in the data sequence, the ranges of values (i.e., the alphabets) of the output and input symbols are the same, as specified.

In some data processing systems, the range of symbol values for a given position in the data sequence may depend not only on the position, but also on the values of other, typically surrounding symbols. For example, in the JPEG 2000 image coding standard, any byte is forbidden to assume values in the range from 90 to FF if the preceding byte is FF, in hexadecimal notation, as well as the value FF if it is the last byte in a sequence. In such systems, it is important to ensure that the output data sequence obtained after applying the encryption algorithm to all or only selected data is compliant with the same syntax rules as the input data sequence, provided that the syntax rules can be algorithmically verified. In particular, the syntax rules may relate to the data format depending on the symbol position and the values of other symbols in the data sequence as well.

With further reference to the ECB mode, it is observed that the basic security requirement regarding the ECB mode of operation of a symmetric-key encryption algorithm is that, without knowing the secret key, it should be computationally infeasible to compute the decryption and encryption functions, from any given number of plaintext-ciphertext pairs assumed to be given in the known plaintext-ciphertext scenario. In particular, it should be computationally infeasible to reconstruct the secret key from any given number of known plaintext-ciphertext pairs generated by using the same secret key. In the related key scenario, the known plaintext-ciphertext pairs generated from the keys related to a given secret key are also allowed. In order to satisfy the basic security requirement, each ciphertext symbol should depend on all plaintext symbols and all secret key symbols in a sufficiently complicated way that is not vulnerable to algebraic and/or probabilistic cryptanalytic attacks. Nevertheless, the encryption and decryption functions should allow a relatively simple representation that is suitable for software and/or hardware implementations, provided that the secret key is known.

Document US-A-2008-0170693 describes an encryption method aiming at preserving the data format which consists in using the well-known Feistel construction with at least three rounds and the round function based on conventional hash functions or block ciphers. a three rounds block ciphers based on conventional hash functions. For each symbol, the data format is controlled by using a combining operation in the round function that is based on modular arithmetic where the modulus determines the alphabet size to be achieved for that symbol.

Document US-A-2006/0227965 discloses an encryption method consisting of dividing the plaintext sequence into parts and repeatedly encrypting each part, one at a time, until the intermediate data sequence composed of all the current parts, unencrypted or encrypted, satisfies the specified syntax rules. Accordingly, initially, the intermediate data sequence coincides with the plaintext sequence and at the end, when all the parts get encrypted, it becomes the ciphertext sequence. The decryption is performed in the opposite direction, by decrypting the parts in the reverse order, each time repeating the decryption of each part until the intermediate data sequence composed of all the current parts, undecrypted or decrypted, satisfies the specified syntax rules. The encryption functions used for encrypting the individual parts may be arbitrary as long as their inputs and outputs are compliant with the lengths of the parts.

The paper of J. Golić, "Modes of operation of stream ciphers" Proceedings of Selected Areas in Cryptography—SAC 2000, Lecture Notes in Computer Science, vol. 2012, pp. 233-247, 2001, describes several generic constructions for converting conventional stream ciphers as keystream generators into block ciphers, keyed hash functions, and hash functions. The starting point, common to all the constructions, is to modify any conventional keystream generator, which produces a keystream sequence independently of the plaintext sequence, by introducing the current plaintext symbol into the next-state function in order to produce the next keystream symbol to be combined with the next plaintext symbol into the next ciphertext symbol. The decryption is performed in the same direction, but the reconstructed next keystream symbol is inversely combined with the next ciphertext symbol into the next plaintext symbol, and so on. In this way, the keystream sequence becomes plaintext dependent and hence potentially useful for obtaining (keyed) hash functions, to be used for message authentication, and block ciphers, to be used for message encryption, also in the ECB mode of operation. Such an unconventional stream cipher is called a stream cipher with plaintext memory.

SUMMARY OF THE INVENTION

The Applicant observes that ECB encryption mode with the same secret key and without variable IV's is important for data anonymization purposes where the ECB mode is applied to selected sensitive data in order to render it anonymous. In this case, the resulting one-to-one correspondence between the original and anonimyzed data is frequency-preserving at hence enables statistical data mining. Moreover, if needed the selected sensitive data can be recovered by using the corresponding secret key.

The Applicant has observed that the method disclosed in US-A-2008-0170693 suffers from three inherent disadvantages. Firstly, the method is not really adapted to deal with variable data sequence lengths, because it requires the plaintext data sequence, as a whole, to be divided into two halves of approximately the same lengths and a round function capable of accepting variable input lengths and providing variable output lengths, which is not automatically satisfied and hence needs to be defined additionally. Secondly, if the adapted modulus is different from the alphabet size obtained at the output of the round function before the combining operation, then the output of the round function is not effectively uniformly distributed with respect to the modulus, which results in detectable statistical weaknesses. Thirdly, the computational complexity of the method may be unacceptably high for some applications, for example, for high-speed communications or very large databases.

The Applicant has observed that the method described in US-A-2006/0227965 works at the cost of inherent information leakage, because partial plaintexts in combination with partial ciphertexts have to satisfy the syntax rules. Therefore, the ciphertext reveals practically useful information about the plaintext, which may not be desirable in some applications. Furthermore, the Applicant has observed that the resulting cipher is insecure to be used in the ECB mode of operation, with the same secret key repeatedly used, if the underlying encryption functions are derived from conventional stream ciphers.

With reference to the above indicated paper of J. Golić, "Modes of operation of stream ciphers" the Applicant has observed that the resulting variable-length block ciphers cannot be used for syntax-compliant encryption by adapting the method from US 2006/0227965 A1, because the decryption needs to be performed in the opposite direction, reconstructing the input symbols in the reverse order, from the last one to the first one, and this is impossible since each keystream symbol depends on previous input symbols which are not yet reconstructed.

The Applicant has dealt with the problem of designing a method for digital data encryption that addresses preservation of the data format and compliance of the encrypted data with the same syntax specifications as the original data, and, preferably, can be securely used in the ECB mode of operation.

The Applicant has perceived that advantages relating to data format and syntax rules preservation can be obtained, as an example, by an encryption method that iteratively generates keystream symbols and the resulting ciphertext symbols, depending on current symbols (such as previous plaintext or ciphertext symbols), by checking data format and/or syntax rules conditions for each keystream and each ciphertext symbol generated.

According to a first aspect, the present invention relates to a symmetric-key encryption method (200; SCP; SCC) of transforming a sequence of plaintext symbols (x) into a sequence of ciphertext symbols (y), the method including an iterative encryption process comprising:

computing (202, ST-ALT) an altered current internal state by combining a current internal state (s) with a current memory symbol;

computing (202, ST-NXT) a next internal state from said altered current internal state;

generating (202, KEY-OUT) a keystream symbol (z) from said next internal state;

verifying (203) whether said generated keystream symbol satisfies a condition related to data-format/syntax rules;

iteratively computing next internal states and iteratively generating next keystream symbols; and encrypting (205, 206, 208) plaintext symbols into the sequence of ciphertext symbols by employing next keystream symbols.

In certain embodiments, the encryption method may further include:

defining an initial internal state (s(k)) from a secret key (k) by applying an initialization algorithm; and wherein iteratively generating next keystream symbols may include iteratively generating keystream symbols until said condition is satisfied so as to define next keystream symbols.

In the encryption method of the present invention, computing a next internal state from said altered current internal state may include applying a next state function (F) to said altered current internal state; and generating the keystream symbol (z) from said next internal state may include applying an output function (f) to said next internal state.

In the encryption method of the present invention, encrypting plaintext symbols may include reversibly combining (205) a next plaintext symbol with a next keystream symbol into a next ciphertext symbol; wherein data formats of said next ciphertext symbol and said next plaintext symbol are the same.

In the encryption method (SCP) of the present invention, said current memory symbol employed to compute (202) the altered current internal state may be a current plaintext symbol; or said current memory symbol employed to compute the altered current internal state may be a current ciphertext symbol.

In certain aspects of the encryption method (SCC) of the present invention, encrypting a next plaintext symbol may be an iteration process including a plurality of iterations; each iteration comprising:

performing (206, 208) a reversible combination of an intermediate plaintext symbol with a next keystream symbol into an intermediate ciphertext symbol, wherein said intermediate plaintext symbol is equal to said next plaintext symbol, in a first iteration, and to said intermediate ciphertext symbol from the preceding iteration, in subsequent iterations;

verifying (207) whether a data sequence comprising previously generated ciphertext symbols, said next ciphertext symbol, and subsequent plaintext symbols satisfies syntax rules;

repeating (206, 208) the encrypting (205) of said next plaintext symbol employing a next keystream symbol until the syntax rules are satisfied; and stopping the iteration process when the syntax rules are satisfied and outputting a last intermediate ciphertext symbol as the next ciphertext symbol.

The encryption method of the present invention may further include:
reversing symbols order of the sequence of ciphertext symbols obtaining a reversed sequence;
applying said iterative encryption process to the reversed sequence to be encrypted so as to generate a further intermediate sequence of ciphertext symbols, and
iteratively reversing symbols order of ciphertext symbols and applying the iterative encryption process until the syntax rules are satisfied,
wherein applying reversing symbols order and encryption process may be repeated at least three times.

In the encryption method of the present invention, encrypting plaintext symbols into a sequence of ciphertext symbols may include modular arithmetic processing.

In accordance with the encryption method of the present invention, computing an altered current internal state by combining a current internal state with a current memory symbol may include:
defining said current internal state and said current memory symbol as binary vectors; and
employing a combining operation of said current memory symbol and a sub-vector of said current internal state,
wherein said combining operation may be a bitwise binary addition of said current memory symbol and a sub-vector of said current internal state.

In accordance with the encryption method of the present invention, said condition related to data-format/syntax rules may include verifying that an l-th keystream symbol $z_l$ is smaller than N−N mod $N_l$, wherein:
N defines a range [0, N−1] of values of keystream symbols; and
$N_l$ defines another range [0, $N_l$−1] of values of an l-th plaintext symbol.

Also, in accordance with the encryption method of the present invention, said condition related to data-format/syntax rules for an l-th plaintext symbol may further include verifying whether an l-th keystream symbol $z_l$, is equal to 0 or $gcd(z_l, N_l)=1$, where gcd denotes the greatest common divisor.

In certain instances, in the encryption method of the present invention, verifying whether said data sequence satisfies syntax rules may comprise employing one of the following techniques: a Turing machine, a finite-state automaton, and a finite-input-memory automaton,
wherein verifying the syntax rules by a finite-input-memory automaton may comprise:
comparing said intermediate ciphertext symbol with permissible values stored in a lookup table, depending on preceding ciphertext symbols and subsequent plaintext symbols.

In certain instances, in the encryption method of the present invention, said iterative encryption process may be performed in one step, by determining the minimum number of iterations by employing the extended Euclidean algorithm.

In the encryption method of the present invention, said next-state and output functions may be derived from the RC4 keystream generator, said encrypting a next plaintext symbol into a next ciphertext symbol may be performed by modular addition, and said computing an altered current internal state may be performed by modular addition of said symbol and the updated j-pointer from the RC4 internal state.

The encryption method of the present invention may be in accordance with an Electronic Code Book (ECB) mode of operation.

In accordance with further aspects, the present invention relates to a symmetric-key encryption system for transforming a sequence of plaintext symbols (x) into a sequence of ciphertext symbols (y), the system comprising a first communication equipment (1) including:
a first computing module (11) adapted to compute an altered current internal state by combining a current internal state (s) with a current memory symbol;
a second computing module (12) adapted to compute a next internal state from said altered current internal state;
a generation module (13) configured to generate a keystream symbol (z) from said next internal state;
a verification module (8) configured to verify whether said generated keystream symbol satisfies a condition related to data-format/syntax rules; wherein the system is configured to iteratively compute next internal states and iteratively generating keystream symbols until said condition is satisfied so as to define a next keystream symbol ($z_l$); and
a symbol encryption module (9) adapted to iteratively encrypt plaintext symbols by employing next keystream symbols to obtain the sequence of ciphertext symbols (y).

The symmetric-key encryption system (100) of the present invention may further include:
a communication network (2) connected to the first communication equipment;
a second communication equipment (3) connected to the network to receive a sequence of ciphertext symbols (y) and comprising:
a key generation module (3, 7) adapted to generate keystream symbols from a secret key received by the first communication equipment; and
a decryption module (3, 25) adapted to process the keystream symbols and the sequence of ciphertext symbols and provide a corresponding sequence of plaintext symbols.

BRIEF DESCRIPTION OF THE DRAWINGS

Exemplified and non-limiting embodiments of the invention are described in detail hereinafter, with reference to the enclosed drawings, wherein.

EXAMPLE OF A ENCRYPTION SYSTEM

Figure 1:
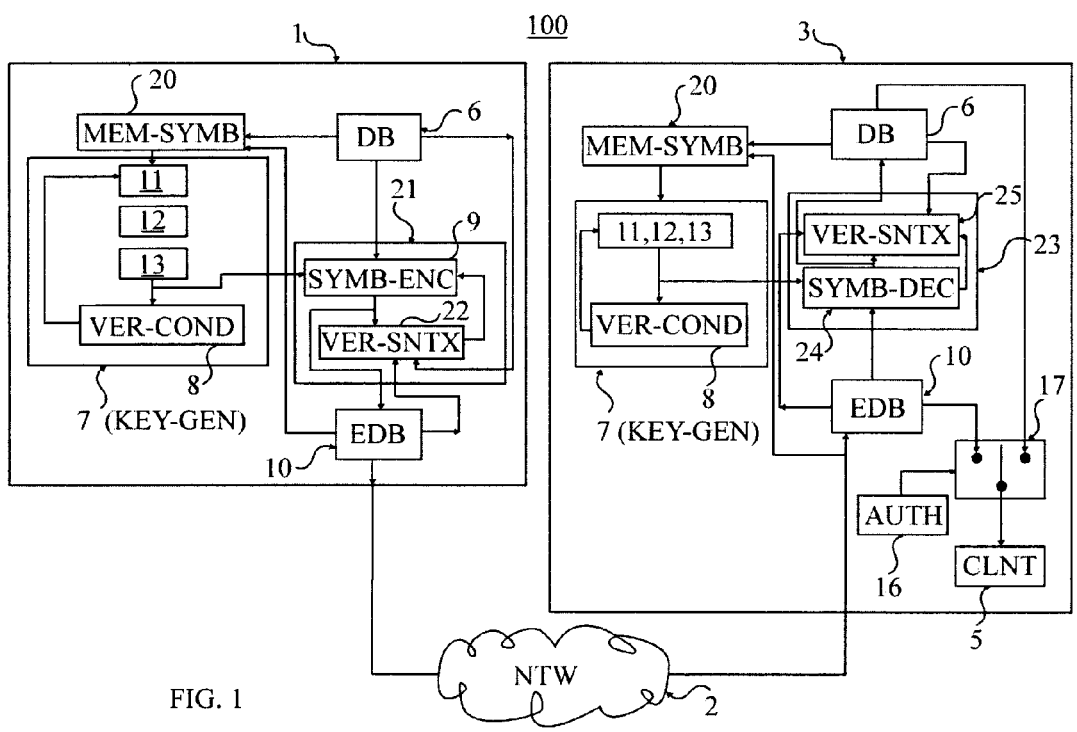
FIG. 1 shows an illustrative cryptographic system 100 in accordance with an embodiment of the invention.

An illustrative cryptographic system 100 in shown in FIG. 1. System 100 includes a first computing equipment 1, a communication network 2 (NTW) and at least a second computing equipment 3. The communication network 2 may be, for instance, a local area network, a wide area network such as the Internet, or another communication system such as a telephone network. The first 1 and second 3 computing equipments may include one or more processing units, personal computers, workstations, computers configured as servers, mainframe computers, portable computers etc.

The first computing equipment 1 includes a first database 6 (DB), a symbol memory interface 20 (MEM-SYMB), and a stream cipher comprising a key generation module 7 (KEY-GEN), an encryption block 21 (ENC-MOD) and a second data base 10 (EDB). As an example, the first database 6 stores data such as the plaintext symbols to be encrypted which can be organized, particularly, as a table of entries with a given structure. The symbol memory interface 20 allows providing data extracted from the first database 6 and/or the second database 10 to the key generation module 7.

The key generation module 7 includes a first state computing module 11, a second state computing module 12, a generation module 13 and a verification module 8 (VER-COND) and is configured to generate keystream symbols. Moreover, the verification module 8 is configured to verify whether the generated keystream symbol satisfies a condition related to data-format/syntax rules. The encryption block 21 comprises an encryption module 9 (SYMB-ENC) and, optionally, a further condition verification module 22 (VER-SNTX). Particularly, the encryption module 9 is adapted to iteratively encrypt plaintext symbols by employing suitable keystream symbols to obtain a sequence of ciphertext symbols. More particularly, the encryption module 9 encrypts sensitive data stored in the first data base 6. Such sensitive data can be, as an instance, an organization of names, addresses, fiscal code number, etc.

The second database 10 can store data corresponding to the key symbols and the encrypted symbols which are provided by the encryption module 9. As an example, normal users, i.e. non authorised users, have access to the second database 10 and not to the first database 6 in order to perform statistical analysis.

With reference to the second computing equipment 3 it is noted that it includes blocks and modules analogous or identical to the ones illustrated with reference to the first computing equipment 1 and therefore having the same numeral references shown in FIG. 1. Alternatively or in addition to an encryption block 21, the second computing equipment 3 is provided with a decryption block 23 including a respective verification module 25 (VER-SNTX) and a description module 24 (SYMB-DEC) adapted to iteratively decrypt ciphertext symbols by employing suitable keystream symbols to obtain a sequence of plaintext symbol.

Moreover, the second computing equipment 3 comprises a client module 5 (CLNT), an authorisation module 16 (AUTH) and a symbolic authorisation switch 17. The authorisation module 16 allows authorised users employing the client module 5 to access, by means of the symbolic authorisation switch 16, data decrypted by the decryption block 23. The client module 5 comprises software applications such as an application allowing the user to manage communications with the first computing equipment 1 on the network 2.

Cryptographic system 100 can be used to provide confidentiality of sensitive data to be transmitted over insecure communications channels or to be stored in insecure computer systems or publicly accessible databases. As will be clear from the following description, the first equipment 1 reversibly transforms plaintext into ciphertext data which can be transformed back to the original form by a decryption algorithm only by the authorized entities and or users, e.g., by the second equipment 2. Particularly, the encryption algorithms implemented by system 100 are able of preserving the format and syntax specifications of digital data to be protected.

Embodiment: Encryption Method

Figure 2:
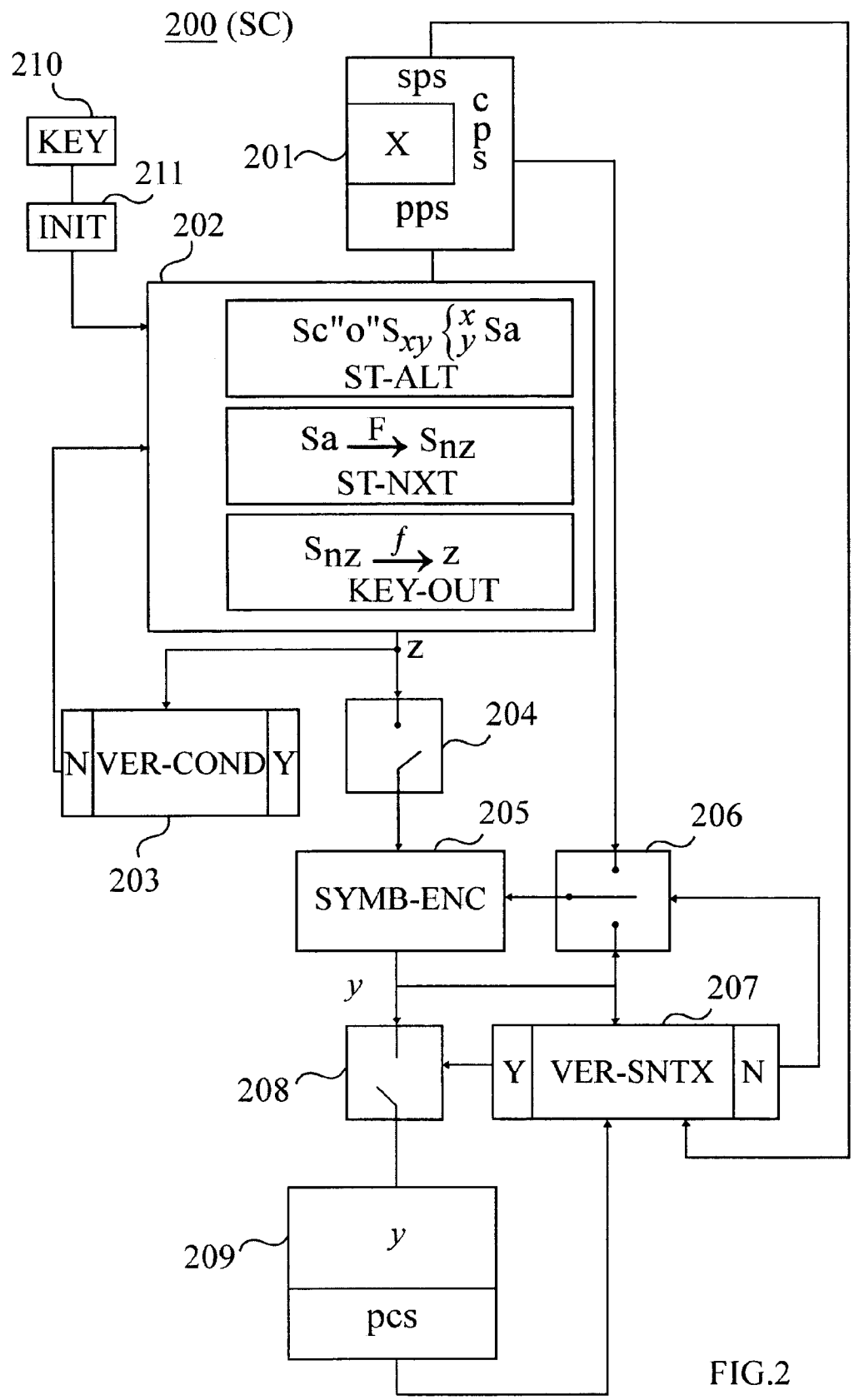
FIG. 2 illustrates a flow chart schematically representing an encryption method in accordance with a particular embodiment of the invention.

FIG. 2 shows a flowchart 200 schematically illustrating an embodiment of a symmetric-key encryption method for transforming a sequence of plaintext symbols x into a sequence of ciphertext symbols y. As an example, method 200 can be carried out by the first communication equipment 1 of the system 100 shown in FIG. 1.

The encryption method 200 includes an encrypting processing SC comprising a plaintext definition step 201 in which the plaintext symbols and they order in the corresponding sequence are defined so as to provide current plaintext symbols (cps), previous plaintext symbols (pps) and subsequent plaintext symbols (sps) to be employed in the subsequent processing steps. The plaintext symbols are stored in the first database 6, as an example.

In a computing step 202 a generation of a keystream symbol z is performed, particularly, by using the key generation module 7 including the verification module 8. In accordance with the shown example, a current internal state $s_c$ is defined and is combined (step ST-ALT) with a symbol $s_{xy}$ in order to obtain an altered current internal state $s_a$. The altered current internal state $s_a$ can be computed by the first state computing module 11. With reference to the generation of the altered current internal state $s_a$, it is observed that this step can be performed according to two different techniques: a technique with plaintext memory and a technique with ciphertext memory. According to a technique with plaintext memory the symbol $s_{xy}$ is a previous plaintext symbol; i.e. the plaintext symbol preceding the current one to be encrypted. Conversely, in accordance with the technique with ciphertext memory, the symbol st is a previous ciphertext symbol; i.e. the ciphertext symbol obtained by encrypting the plaintext symbol preceding the one to be encrypted. Particularly, the method 200 also comprises a secret key supplying step 210 (KEY) in which a secret key k is supplied to he first computing equipment 1 to evaluate a initial value of the current internal state $s_c$ (step 211, INIT).

Moreover, the computing step 202 includes a step in which a next internal state $s_{nt}$ is computed (step ST-NXT) from the altered current internal state $s_a$. The next internal state $s_{nt}$ can be obtained by the second state computing module 12. From the computed next internal state $s_{nt}$ a next keystream symbol z is then computed (step KEY-OU), as an example, employing the key generation module 13.

In a verification step 203 (VER-COND) a check is performed to verify whether the generated keystream symbol z satisfies a condition related to data-format/syntax rules. The verification step 203 is performed, as an example, by the verification module 8 of FIG. 1. If the condition of the verification step 203 is not satisfied (N) the computations made in step 202 are iteratively performed until such condition is verified. If the verification step 203 gives a positive result (Y) the method continues, i.e. a first symbolic switch 204 is closed, and an encryption step 205 (SYMB-ENCR) is carried out. In the encryption step 205 the current plaintext symbols (cps) are iteratively encrypted by employing next keystream symbols z to obtain the sequence of ciphertext symbols y available in step 209. The encryption step 205 can be performed by the encryption module 9.

According to a particular embodiment, a further verification step 207, VER-SNTX, (e.g. by using the further condition verification module 22) is performed in order to verify whether a data sequence comprising previously ciphertext symbols (pcs), said next ciphertext symbol (y), and subsequent plaintext symbols (sps) satisfies the syntax rules. If such data sequence satisfies the syntax rules of step 207 (Y) a second symbolic switch 208 is closed and the sequence of ciphertext symbols is stored in the second database 10 (step 209). If the data sequence does not satisfy the syntax rules of step 207 (N) the second symbolic switch 208 is opened and the encryption step 205 is repeated. A symbolic third switch 206 allows transferring of the corresponding symbols to suitable blocks representing processing steps in FIG. 2.

Advantageously, the encryption processing SC is symbol-based, i.e. the described encryption method deals with one symbol at a time. On the contrary, block-based algorithm divides input sequence in blocks of symbols and deal with one block at a time. Symbol-based implies flexibility in treating variable-length input sequences.

With reference to the decryption, which can be performed by the second computing equipment 2, it can be carried out by a method which is analogous to the one described with reference to FIG. 2. Decryption method does not perform the encryption step 202 but it employs a decryption step in which the keystream symbols generated are employed in a description algorithm to provide corresponding decrypted stream symbols.

First Example

Stream Cipher with Plaintext Memory (SCP)

Figure 3:
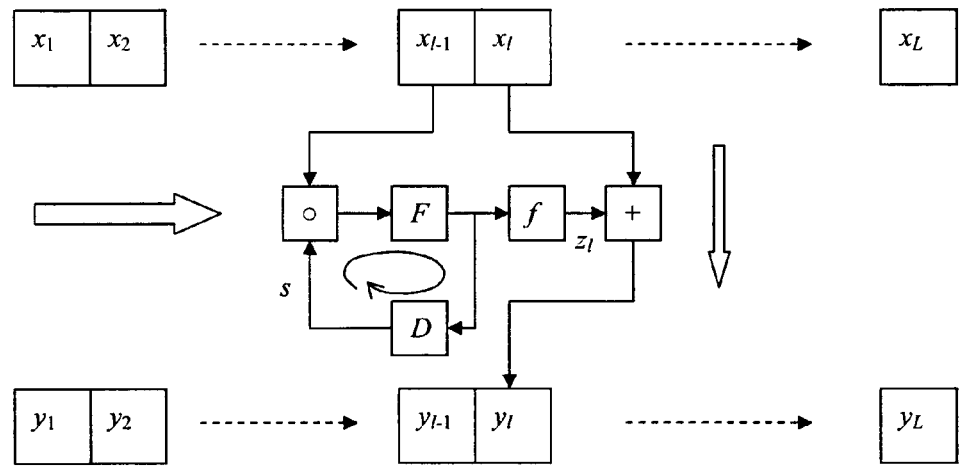
FIG. 3 schematically shows an encryption algorithm in accordance with a first example of the invention.

Reference is made to the case in which the technique with plaintext memory is employed. Particularly, FIG. 3 schematically shows an example of the algorithm corresponding to the iterative encryption process SC of the first communication equipment 1 described above, i.e., a particular iterative encryption process indicated hereinafter as SCP.

The iterative encryption process SCP is implementable by employing a generic keystream generator, which, in conventional applications, is adapted to produce a keystream sequence from a given secret key. The sequence of plaintext symbols x includes L symbols $x_1 \ x_2 \ldots x_{l-1} \ x_l \ldots x_L$, the sequence of ciphertext symbols y includes L symbols $y_1 \ y_2 \ldots y_{l-1} \ y_l \ldots y_L$, and the sequence of keystream symbols z includes L symbols $z_1 \ z_2 \ldots z_{l-1} \ z_l \ldots z_L$.

The plaintext sequence is reversibly combined with the keystream sequence, on a symbol-by-symbol basis, to produce the ciphertext sequence.

Let the plaintext, ciphertext, and keystream symbols belong to the same finite set, Z, called an alphabet and let, in additive notation, '+' denote the combining, symbol-based encryption operation defined as a binary operation on Z. Then, $y_l = x_l + z_l$ where the combining operation should possess the reversibility property that, for each value of $z_l$, $y_l$ is a reversible function of $x_l$, so that $x_l$ can be recovered by the reverse operation, denoted by '−', as $x_l = y_l − z_l$. In mathematical terms, the combining operation is a group or quasigroup operation. For example, the combining operation can be defined as an addition modulo b of integers, where b is a given positive integer. For binary integers, the resulting addition modulo 2 is also called the binary addition or the XOR operation.

A keystream generator can be defined as a finite-state automaton in terms of a next-state function F: S→S and output function $f$: S→Z, respectively, with the finite internal state space S and the finite output symbol space Z. In conventional applications of keystream generators, for each new keystream symbol z to be generated, the internal state s is first updated by the next-state function F and a keystream symbol z is then produced by applying the output function $f$ to the updated internal state. The initial state is defined in terms of a secret key, and the next-state and output functions can also depend on this key. The produced keystream sequence then depends only on the secret key.

In order to achieve the security in the ECB mode of operation, the iterative encryption process SCP makes use of a generic keystream generator that is modified to produce a keystream sequence which, apart from the secret key, also depends on the plaintext sequence. To this end, the current memory symbol that is used for generating the next keystream symbol to be combined with the next plaintext symbol to produce the next ciphertext symbol is defined as the current plaintext symbol.

In greater detail, the iterative encryption process SCP of a generic stream cipher with plaintext memory adapted to preserve variable data format can be expressed by the following algorithm steps, depicted in FIG. 3. In an initialization step, the initial state s and a first initial memory (plaintext) symbol are defined:

| | |
|---|---|
| Initialization: s = s(k) and $x_0 = 0$. | (1) |
| Subsequently, for l=1, 2, ..., L: | |
| $x \leftarrow x_{l-1}$ | (2) |
| Repeat until $z < N − N \bmod N_l$ | (3) |
| $s \leftarrow s \circ x$ | (4) |
| $s \leftarrow F(s)$ | (5) |
| $z \leftarrow f(s)$ | (6) |
| $x \leftarrow 0$ | (7) |
| $y_l \leftarrow (x_l + z) \bmod N_l$. | (8) |

Here, k represents a secret key, which has to be sent from the first communication equipment 1 to the second communication equipment 3 of FIG. 1.

In expression (4), the current state s is combined with the current memory symbol defined as the current plaintext symbol x into a new, altered state by $s \leftarrow s \circ x$, where the combining operation '∘' should possess the property that for any value of s, any change in x should result in a change of s. For example, if s and x are binary vectors, where the dimension of x is smaller than or equal to that of s, then '∘' can be a bitwise addition modulo 2 of x and a sub-vector of s, while the remaining components of s are kept intact. Particularly, the combination of expression (4) is performed by the first state computing module 11 during the computing step 202.

The computation of expression (5), employing the next-state function F can be performed by the second state computing module 12. For example, the next-state function F can be defined as in the RC4 keystream generator, as described in the fifth example below. The next-state produced is then given as F(s ∘ x). The delay block D of FIG. 3 indicates that the next-state produced in the current iteration is used as the current state in the next iteration.

The output function $f$ of expression (6) is employed by the key generation module 13. For example, the output function $f$ can be defined as in the RC4 keystream generator, as described in the fifth example below. The next keystream symbol produced is then given as $z = f(F(s \circ x))$. An additional desirable property of the combining operation '∘' is that, for any value of s, any change in x should result in a random-looking change of the next keystream symbol z as well as of all the subsequent keystream symbols.

Advantageously, the iterative encryption process SCP defined by expressions (1)-(8) employs modular arithmetic in expression (8) in order to allow the variable data format of plaintext/ciphertext symbols to be controlled. Particularly, the range of values of ciphertext symbols is controlled by combining the plaintext and keystream symbols by modular arithmetic with a variable modulus adapted to the range of values to be achieved. The variable length of plaintext sequences as part of data format is automatically preserved in the corresponding ciphertext sequences by the symbol-based stream cipher operations.

In greater detail, to the end of controlling variable data format, the plaintext symbols are all mapped into nonnegative integers, where the mapping depends on the position in the plaintext sequence if the alphabet of plaintext symbols is variable. Consequently, the plaintext symbols can be regarded as nonnegative integers. The generated keystream symbols are generated as or mapped into nonnegative integers and the combining operation (8) for producing the ciphertext symbols is modular addition, so that the obtained ciphertext symbols are also nonnegative integers, which should have the same data format as the plaintext symbols. Other mappings and other combining operations can also be used, e.g., modular multiplication and mapping into positive integers.

More precisely, with reference to expressions (3) and (8), [0, N−1] is the range of values of keystream symbols, which is independent of the position in the data sequence, and the probability distribution of keystream symbols is uniform or nearly uniform in this range, under the assumption that the secret key is generated randomly. Let $[0, N_l-1]$ be the range of values of the l-th plaintext symbol which should be preserved by the corresponding l-th ciphertext symbol. The dependence of $N_l$ upon l represents the variable data format to be preserved by the encryption.

Reference is now made to the further problem of a generally nonuniform distribution of keystream symbols, uniformly generated in the range [0, N−1] and taken modulo $N_l$ in the combination operation (8). To guarantee the uniform distribution, which is required in order to prevent information leakage, it is necessary, but not sufficient to ensure that $N \leq N_l$, for every l, which is easily satisfied. A preferred condition, which is sufficient for the uniform distribution, is to ensure that the l-th keystream symbol $z_l$ satisfies $z_l < N - N \bmod N_l$, for every l (condition in expression (3)). Checking this condition in expression (3) is an example of the verification step 203 described with reference to FIG. 2. The condition can be satisfied by additional iterations of the next-state and output functions, i.e., by the additional clocking of the keystream generator, according to the iterative process defined by expressions (3)-(7). In particular, the number of additional iterations can be required to be minimal possible. The preceding plaintext symbol influencing the next-state function can be assumed to be equal to 0 during the additional clocking (expression (7)).

Figure 4:
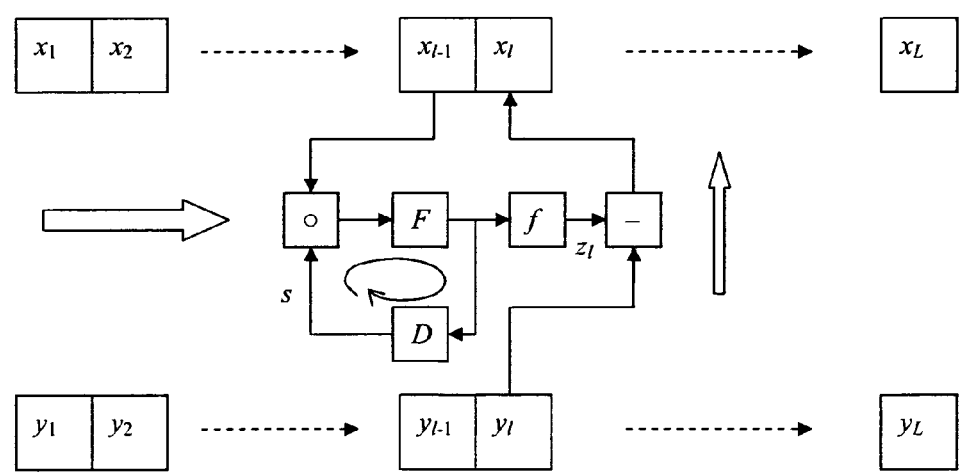
FIG. 4 schematically shows a decryption algorithm in accordance with said first example of the invention.

The iterative decryption process $SCP^{-1}$ of the second communication equipment 3 of FIG. 1 performs the inverse transformation of the iterative encryption process SCP and thus recovers the plaintext sequence from the ciphertext sequence, by employing the same secret key transmitted from the first communication equipment 1 of FIG. 1. This process can be expressed by the following algorithm steps, depicted in FIG. 4. In an initialization step, the initial state s and the initial memory (plaintext) symbol are defined:

$$\text{Initialization: } s = s(k) \text{ and } x_0 = 0. \quad (9)$$
$$\text{Subsequently, for } l=1, 2, ..., L:$$
$$x \leftarrow x_{l-1} \quad (10)$$
$$\text{Repeat until } z < N - N \bmod N_l \quad (11)$$
$$s \leftarrow s \circ x \quad (12)$$
$$s \leftarrow F(s \circ x) \quad (13)$$
$$z \leftarrow f(s) \quad (14)$$
$$x \leftarrow 0 \quad (15)$$
$$x_l \leftarrow (y_l - z) \bmod N_l. \quad (16)$$

It is observed that iterative encryption process SCP defined by expressions (1)-(8) and iterative decryption process defined by expressions (9)-(16) are hereinafter denoted by $y = SCP_{s(k),k}(x)$ and $x = SCP_{s(k),k}^{-1}(y)$, respectively, since they depend on the initial state s(k) while the next-state and output functions can also depend on the secret key. It is noted that both of them are applied to the input data sequence in the forward direction.

Second Example

Stream Cipher with Ciphertext Memory (SCC)

Figure 5:
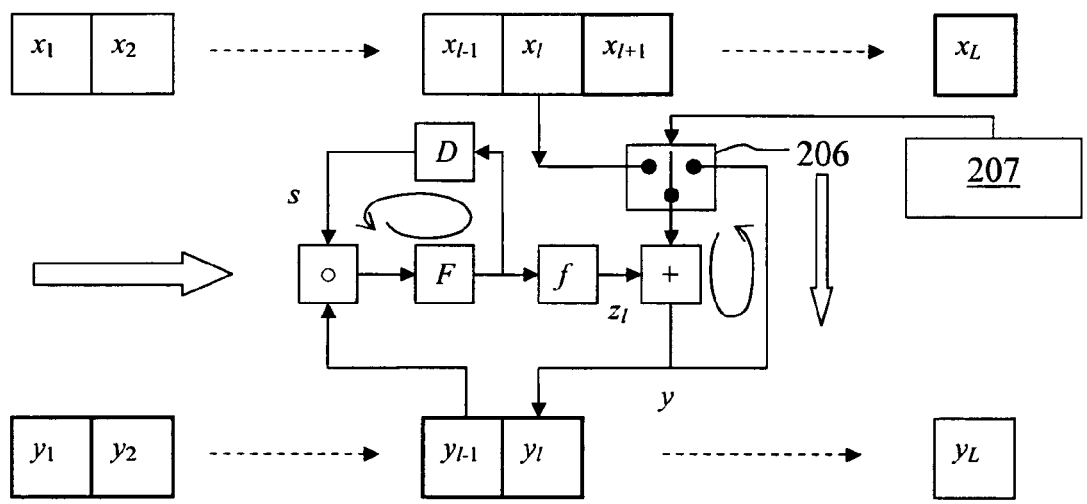
FIG. 5 schematically shows an encryption algorithm in accordance with a second example of the invention.

Reference is now made to the case in which the technique with ciphertext memory is employed. Particularly, FIG. 5 schematically shows an example of the algorithm corresponding to the iterative encryption process SC, i.e., a particular iterative encryption process indicated hereinafter as SCC. It is clear from the present description how to express the algorithm corresponding to the iterative encryption process for subsequent rounds involving reversed sequenced.

In order to achieve the security in the ECB mode of operation, the iterative encryption process SCC makes use of a generic keystream generator that is modified to produce a keystream sequence which, apart from the secret key, also depends on the ciphertext sequence. To this end, the current memory symbol that is used for generating the next keystream symbol to be combined with the next plaintext symbol to produce the next ciphertext symbol is defined as the current ciphertext symbol. The plaintext memory, as explained above, makes it possible to preserve variable data format, which can be regarded as a stateless syntax rule. The ciphertext memory makes it possible to preserve both statefull syntax rules and stateless syntax rules.

Accordingly, the iterative encryption process SCC of a generic stream cipher with ciphertext memory adapted to preserve syntax rules and variable data format can be expressed by the following algorithm steps, depicted in FIG. 5. In an initialization step, the initial state s and the initial memory (ciphertext) symbol are defined:

$$\text{Initialization: } s = s(k) \text{ and } y_0 = 0. \quad (17)$$
$$\text{For } l=1, 2, ..., L: \quad (18)$$
$$y \leftarrow y_{l-1} \quad (19)$$
$$\text{Repeat until } z < N - N \bmod N_l \text{ and } (z = 0 \text{ or } \gcd(z, N_l) = 1) \quad (20)$$
$$s \leftarrow F(s \circ y) \quad (21)$$
$$z \leftarrow f(s) \quad (22)$$
$$y \leftarrow 0 \quad (23)$$
$$y \leftarrow x_l \quad (24)$$
$$\text{Repeat until } y_1 y_2 ... y_{l-1} y x_{l+1} x_{l+2} ... x_L \text{ is syntax compliant} \quad (25)$$
$$y \leftarrow (y + z) \bmod N_l \quad (26)$$
$$y_l \leftarrow y \quad (27)$$
$$\text{Output: } y \leftarrow y_1 y_2 ... y_L. \quad (28)$$

This particular iterative encryption process defined by expressions (17)-(28) is denoted by $y = SCC_{s(k),k}(x)$ and is applied to the input data sequence, x, in the forward direction. Some of the expressions (17)-(28) are clear from the description made with reference to iterative encryption process SCP defined by expressions (1)-(8). The stream cipher implementing the iterative encryption process SCP ensures that the ciphertext sequence satisfies the same syntax rules as the plaintext sequence.

In greater detail, it is clear from expression (21) that the current state s is combined with the current memory symbol defined as the current ciphertext symbol y. Checking the conditions in expression (20) is an example of the verification step 203 while the iterative symbol-encryption process indicated by expressions (25)-(26) is an example of the iterative elaboration corresponding to the further verification step 207 of FIG. 2. This iterative symbol-encryption process is a modular addition with the same keystream symbol, z, that is repeated the minimum number of iterations needed for the intermediate data sequence, composed of the partial ciphertext and plaintext sequences, to satisfy the syntax rules. If the stateless syntax rules specified by the variable data format are dealt with by using the variable modulus, then the l-th keystream symbol $z_l$ is required to satisfy the condition $z_l < N - N$ mod $N_l$, as explained above.

In addition, to ensure the compliance with the statefull syntax rules, a further condition that either $z_l = 0$ or $\gcd(z_l, N_l) = 1$ is also required (where gcd is the greatest common divisor). Both the conditions can be satisfied by the additional irregular clocking of the keystream generator, according to the iterative process defined by expressions (20)-(23), where it is assumed that the preceding ciphertext symbol influencing the next-state function can be assumed to be equal to 0 during the additional clocking. If $z_l = 0$, then $y_l = x_l$, necessarily. If $\gcd(z_l, N_l) = 1$, then $y_l = (x_l + i_{min} z_l) \bmod N_l$, where $i_{min}$ is the minimum number of iterations i in [1, $N_l$] that are needed to satisfy the syntax rules. Since in this case $\{iz: 1 \leq i \leq N_l\} = [0, N_l - 1]$, we will have $i_{min} = N_l$, i.e., $y_l = x_l$ only if it is impossible to satisfy the syntax rules by other symbols $y_l$. It should be noted that $y_l = x_l$ automatically satisfies the syntax rules due to the syntax rule verification performed when the preceding ciphertext symbol, $y_{l-1}$, was generated.

Alternatively, the same modulus $N_l = N$ can be kept, for every l, and then the data format is treated as a stateless part of the syntax rules, i.e., as a rule $0 \leq y_l \leq N_l - 1$. It is noted that if $N_l = N$, then the condition $z_l < N - N \bmod N_l$ is automatically satisfied. However, in this case the minimum number of iterations $i_{min}$ is typically larger, especially if $N_l$ is much smaller than N.

Figure 6:
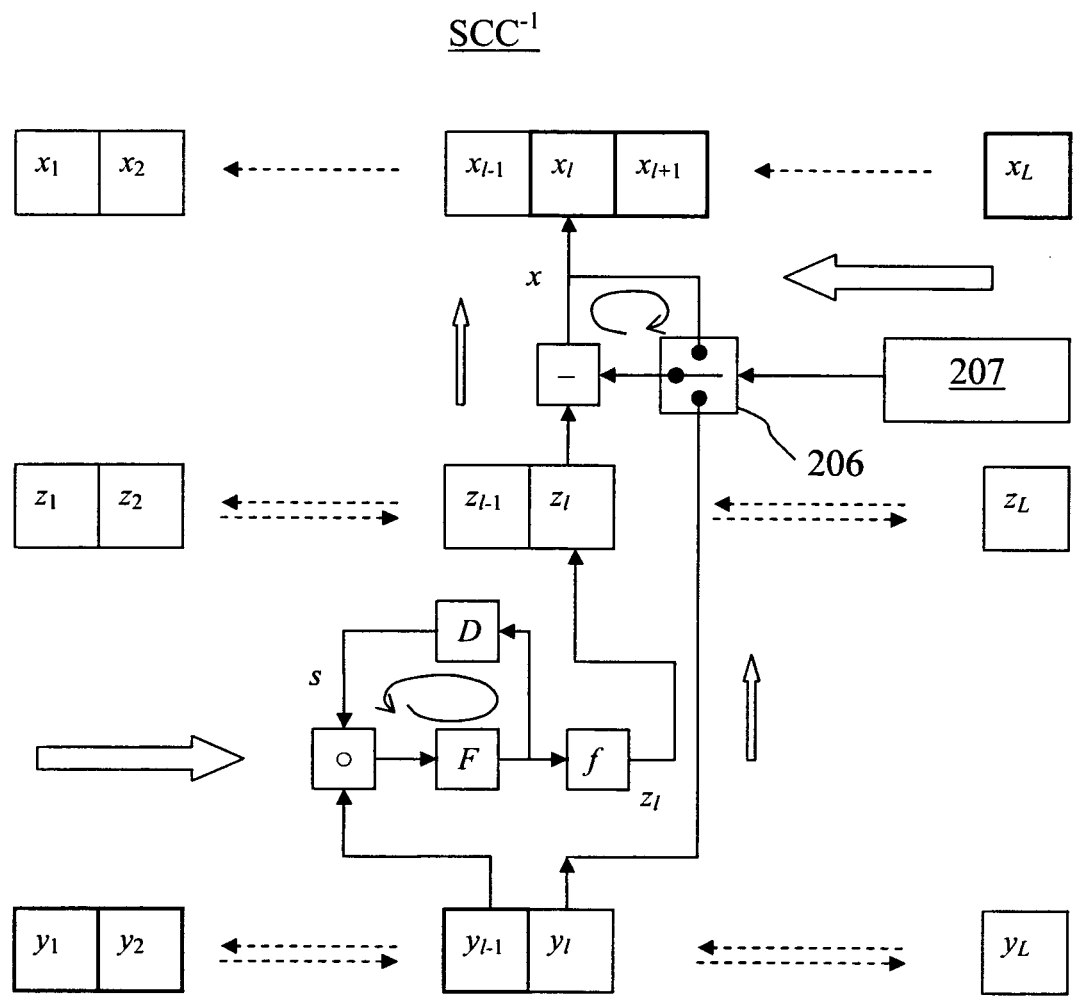
FIG. 6 schematically shows a decryption algorithm in accordance with a second example of the invention.

Accordingly, the iterative decryption process $SCC^{-1}$ of a generic stream cipher with ciphertext memory adapted to preserve syntax rules and variable data format can be expressed by the following algorithm steps, depicted in FIG. 6. In an initialization step, the initial state s and the initial memory (ciphertext) symbol are defined:

| | |
|---|---|
| Initialization: $s = s(k)$ and $y_0 = 0$. | (29) |
| For l=1, 2, ..., L: | (30) |
| $\quad y \leftarrow y_{l-1}$ | (31) |
| $\quad$ Repeat until $z < N - N \bmod N_l$ and ($z = 0$ or $\gcd(z, N_l) = 1$) | (32) |
| $\quad\quad s \leftarrow F(s \circ y)$ | (33) |
| $\quad\quad z \leftarrow f(s)$ | (34) |
| $\quad\quad y \leftarrow 0$ | (35) |
| $\quad z_l \leftarrow z$ | (36) |
| Output: $z \leftarrow z_1 z_2 ... z_L$ | (37) |
| For l=L, L-1 ..., 1 | (38) |
| $\quad x \leftarrow y_l$ | (39) |
| $\quad$ Repeat until $y_1 y_2 ... y_{l-1} x x_{l+1} x_{l+2} ... x_L$ is syntax compliant | (40) |
| $\quad\quad x \leftarrow (x - z_l) \bmod N_l$ | (41) |
| $\quad x_l \leftarrow x$ | (42) |
| Output: $x \leftarrow x_1 x_2 ... x_L$. | (43) |

This particular iterative decryption process defined by expressions (29)-(43) is denoted by $x = SCC_{s(k),k}^{-1}(y)$ and is applied to the input data sequence, y, in the backward direction. To this end, the keystream sequence, z, is first generated and memorized as a whole, by (29) and the iterative process (30)-(37), by employing the same secret key, k. The backward direction is necessary for the iterative symbol-decryption process indicated by expressions (40)-(41) to work correctly, i.e., to recover the original plaintext symbol $x_l$.

In accordance with a particular embodiment, the plaintext, ciphertext, and keystream symbols can be represented as sequences of sub-symbols and the keystream generator (expressions (20)-(23) or (32)-(35)) then operates on the level of sub-symbols, whereas the combining operations for symbol encryption (e.g., expression (26)) and symbol decryption (e.g., expression (41)) are performed on the level of symbols as nonnegative integers as described above. This means that in each iteration of the keystream generator, the next-state function F accepts one input sub-symbol and the output function $f$ generates one keystream sub-symbol. In particular, the sub-symbols can be binary values, i.e., bits. The additional clocking of the keystream generator in order to satisfy the conditions on the level of keystream symbols, which are specified as above, is thus performed on the level of sub-symbols, not symbols, which speeds up the keystream generation.

Third Example

ECB Mode of Operation

This third example can be applied to every one of the iterative encryption processes above indicated (SCC and SCP); therefore the following description will refer to the generic iterative encryption process SC. The third example is preferred in order to obtain a secure ECB mode of operation.

The Applicant has noticed that the above introduced iterative encryption and decryption processes $y = SCP_{s(k),k}(x)$ and $x = SCP_{s(k),k}^{-1}(y)$, respectively, are symbol based and preserve variable data format, but they possess an inherent property which may not be desirable for the ECB mode of operation. Namely, each ciphertext symbol depends only on the current and previous plaintext symbols. In particular, this implies that by manipulating a number of the last plaintext and ciphertext symbols in any given plaintext-ciphertext pair, one may with high probability obtain a new plaintext-ciphertext pair. For the same reason, although the introduced iterative encryption and decryption processes $y = SCC_{s(k),k}(x)$ and $x = SCC_{s(k),k}^{-1}(y)$, respectively, are symbol based and preserve syntax rules, they are not suitable to be used directly in the ECB mode of operation. In addition, the syntax-preserving method works at the cost of inherent information leakage, because partial plaintexts in combination with partial ciphertexts have to satisfy the syntax rules. Therefore, the ciphertext reveals practically useful information about the plaintext, which is not desirable for the ECB mode of operation. Therefore, the third example to be described below results particularly advantageous for the ECB mode of operation.

According to the third example, the encryption method 200 of FIG. 2 includes at least three rounds of the stream cipher encryption, where the input to the first round is a variable-length plaintext sequence and the input to each subsequent round is the reversed ciphertext sequence from the preceding round in which the ciphertext symbols are taken in the reverse order. Accordingly, the intermediate ciphertext from the preceding round is memorized. The encryption method of the third embodiment can be expressed by notation $y = E_k(x)$. The three-round encryption process is described in greater detail below:

First round: $y^1 = SC_{s(k,1),k}(x)$ (44)

Reverse $y^1$ (45)

Second round: $y^2=SC_{s(k,2),k}(y^1)$ (46)

Reverse $y^2$ (47)

Third round: $y=SC_{s(k,3),k}(y^2)$. (48)

As is clear form the above description, notations $SCP_{s(k),k}$ and $SCP_{s(k),k}^{-1}$ stand for the stream cipher encryption and decryption processes with plaintext memory, respectively; notations $SCC_{s(k),k}$ and $SCC_{s(k),k}^{-1}$ stand for stream cipher encryption and decryption processes with ciphertext memory, respectively; and notations $SC_{s(k),k}$ and $SC_s(k),k^{-1}$ stand for generic encryption and decryption processes, such as, for instance, the above indicated SCP and SCC encryption and decryption processes, respectively.

It is observed that, in even rounds (e.g., in the second round of expression (46)), the syntax rules are applied in the backward direction since the input sequence is taken in the backward rather than forward direction. It is observed that the additional two or more rounds practically eliminate the inherent information leakage present in the method from US-A-2006/0227965.

With reference to the decryption, a corresponding three-round decryption process $x=D_k(y)$ is then given by:

Third round: $y^2=SC_{s(k,3),k}^{-1}(y)$ (49)

Reverse $y^2$ (50)

Second round: $y^1=SC_{s(k,2),k}^{-1}(y^2)$ (51)

Reverse $y^1$ (52)

First round: $x=SC_{s(k,1),k}^{-1}(y^1)$. (53)

In general, the round stream ciphers may have different initial states derived from the same secret key k and different round serial numbers by an initialization algorithm, whereas the next-state and output functions are assumed to be the same and, possibly, dependent on k. In particular, for simplicity, the initial states of individual rounds can be chosen to be all equal, i.e., $s(k,1)=s(k,2)=s(k,3)=s(k)$.

Fourth Example

Syntax Rules Verification

Reference is now made to the iterative encryption and decryption processes $SCC_{s(k),k}$ and $SCC_{s(k),k}^{-1}$ (i.e., techniques with ciphertext memory) and to the steps of verifying if the intermediate data sequence satisfies the syntax rules or not (steps corresponding to expressions (25) and (40)).

Preferably, syntax rules are verifiable algorithmically, i.e., there is a known algorithm that for any finite-length input data sequence, after a finite number of steps determines if the sequence satisfies the syntax rules or not. Equivalently, the language defined by the syntax rule can be decidable by a Turing machine. In particular, it may be decidable by a finite-state automaton.

Furthermore, the language may be decidable by a finite-input-memory automaton, whose internal state consists of a number, m, of consecutive symbols in the input sequence. In this case, the required verification of syntax rules due to a change of only one current symbol at a time, can be performed by examining only 2m+1 consecutive data symbols, i.e., the current symbol and the m preceding and m subsequent symbols. More precisely, in the encryption process, the syntax rules need to be verified for the sequence $y_{l-m} \ldots y_{l-1} y x_{l+1} \ldots x_{l+m}$, and, in the decryption process, for the sequence $y_{l-m} \ldots y_{l-1} x x_{l+1} \ldots x_{l+m}$. If m is not too large, then the verification can be easily done in one step by using a lookup table storing all the permissible values of the middle symbol depending on the values of the m preceding and m subsequent symbols. Namely, it suffices to check if the examined symbol is permissible or not by comparing it with the permissible symbols obtained from the lookup table.

Moreover, if $\gcd(z_l, N_l)=1$, since computing discrete logarithms in the additive group of integers modulo a positive integer can be performed efficiently by the extended Euclidean algorithm, then the required minimum number of iterations $i_{min}$ can be derived by first recovering all the permissible symbol values v for the current symbol (e.g., from the lookup table) and then, for each found v, deriving the required number of iterations i as a unique solution in $[1, N_1]$ to the equation $iz_l \equiv v-x_l \pmod{N_l}$, for the encryption process, or $iz_l \equiv y_l-v \pmod{N_l}$, for the decryption process, by the extended Euclidean algorithm. Finally, $i_{min}$ is determined as the minimum among the derived values of i. If $i_{min}$ is determined, then the iterative symbol-encryption process corresponding to expressions (25)-(26) can be computed in one step as $y_l=(x_l+i_{min} Z_l) \bmod N_l$. Similarly, the iterative symbol-decryption process corresponding to expressions (40)-(41) can be computed in one step as $x_l=(y_l-i_{min} z_l) \bmod N_l$.

It is possible to pre-compute and store the values of all the solutions i in the expanded lookup table for a reference value $z_{ref}=1$ and a reference value $x_{ref}$ depending on the surrounding 2m symbols. For any given $z_l$ and $x_l$, the value $i_{min}$ can then be obtained by additional simple computations by using the expanded lookup table. More precisely, the solutions i' corresponding to $z_l$ are first computed as $\{i'_1, i'_2, \ldots\}$ by arranging in increasing order the set $\{z_l^{-1}i_1, z_l^{-1}i_2, \ldots\}$, where $\{i_1, i_2, \ldots\}$ are the stored solutions corresponding to $z_{ref}=1$, and $z_l^{-1}$ is the multiplicative inverse of $z_l$ modulo $N_l$ (i.e., $z_l^{-1}z_l \equiv 1 \pmod{N_l}$), which can be pre-computed and stored, by the extended Euclidean algorithm. Here, it is assumed that the product $z_l^{-1}i_j$ is taken modulo $N_l$ if $i_j < N_l$ and remains equal to $N_l$ if $i_j = N_l$.

Then, for the encryption process, if $x_j=(x_{ref}+i'_j z_l) \bmod N_l$, then $i_{min}=i'_{j+1}$, and for the decryption process, if $y_j=(x_{ref}+i'_j z_l) \bmod N_l$, then $i_{min}=i'_{j-1}$, where the indices j+1 and j-1 are cyclically shifted if they fall out of range. Alternatively, the values $i_{min}$ can be all precomputed in this way and then stored in an even larger lookup table, depending on $z_l$ and $x_l$ or $y_l$. This method may work efficiently even if the probability of satisfying the syntax rules by changing a single symbol in a data sequence is small or very small.

Fifth Example

RC4 Type Keystream Generator

According to the fifth example, the keystream generator is of the RC4 type. The RC4 stream cipher is widely used in the Internet and wireless communications as well as in many commercial products.

Apart from its simplicity and a relatively high security level with respect to publicly known initial-state reconstruction attacks, RC4 is suitable for the integer arithmetic since it can generate uniformly distributed integers in the range [0, N−1], for any positive integer N, by taking the RC4 modulus to be equal to N. The internal state of a standard RC4 with the modulus N consists of a permutation table S of all N different integers from [0, N−1] together with two pointers i and j as integers from [0, N−1], which indicate the positions in the table. The pointer i changes in time deterministically, starting from the initial value i=0, for each new keystream symbol to be generated being incremented by 1 modulo N. The entry of S at a position i is denoted by S[i], for any $0 \leq i \leq N-1$.

The next-state function and output function of a standard RC4 are known and given by:

$$i \leftarrow i+1, j \leftarrow j+S[i], \text{Swap } S[i] \text{ and } S[j] \quad (54)$$

$$z \leftarrow S[S[i]+S[j]], \quad (55)$$

respectively, where all the additions are modulo N. The initial state consists of a secret-key dependent initial permutation S(k) and the fixed pointer values i=j=0. The initial permutation is produced by the initialization algorithm to be specified in the sequel.

In order to introduce the needed plaintext or ciphertext memory, the next-state function of RC4 is modified so that the preceding input (plaintext or ciphertext) symbol, as integer, is added modulo N to the updated j pointer.

Particularly, the RC4 generator employed in accordance with the fifth embodiment is configured in order to implement the keystream generation expressions described above with reference to the second example, the third example, or the fourth example.

According to a first embodiment of the fifth example, the iterative encryption process $y=RC4P_{S(k)}(x)$ of a RC4 type keystream generator with plaintext memory adapted to preserve variable data format is given by:

| | |
|---|---|
| Initialization: S = S(k), i = j = 0, and $x_0$ = 0 | (56) |
| For l=1, 2, ..., L: | (57) |
| $\quad x \leftarrow x_{l-1}$ | (58) |
| $\quad$ Repeat until $z < N - N \mod N_l$ | (59) |
| $\quad\quad i \leftarrow i + 1$ | (60) |
| $\quad\quad j \leftarrow j + S[i] + x$ | (61) |
| $\quad\quad$ Swap S[i] and S[j] | (62) |
| $\quad\quad z \leftarrow S[S[i] + S[j]]$ | (63) |
| $\quad\quad x \leftarrow 0$ | (64) |
| $\quad y_l \leftarrow (x_l + z) \mod N_l$. | (65) |

The iterative decryption process $x=RC4P_{S(k)}^{-1}(y)$ in accordance with the first embodiment of the fifth example comprises expressions (56)-(64) and the following symbol-decryption operation:

$$x_l \leftarrow (y_l - z) \mod N_l. \quad (66)$$

According to a second embodiment of the fifth example, an iterative encryption process $y=y=RC4C_{S(k)}(x)$ of a RC4 type keystream generator with ciphertext memory adapted to preserve syntax rules and variable data format is given by:

| | |
|---|---|
| Initialization: S = S(k), i = j = 0, and $y_0$ = 0 | (67) |
| For l=1, 2, ..., L: | (68) |
| $\quad y \leftarrow y_{l-1}$ | (69) |
| $\quad$ Repeat until $z < N - N \mod N_l$ and (z = 0 or gcd(z, $N_l$) = 1) | (70) |
| $\quad\quad i \leftarrow i + 1$ | (71) |
| $\quad\quad j \leftarrow j + S[i] + y$ | (72) |
| $\quad\quad$ Swap S[i] and S[j] | (73) |
| $\quad\quad z \leftarrow S[S[i] + S[j]]$ | (74) |
| $\quad\quad y \leftarrow 0$ | (75) |
| $\quad y \leftarrow x_l$ | (76) |
| $\quad$ Repeat until $y_1 y_2 ... y_{l-1} y x_{l+1} x_{l+2} ... x_L$ is syntax compliant | (77) |
| $\quad\quad y \leftarrow (y + z) \mod N_l$ | (78) |
| $\quad y_l \leftarrow y$ | (79) |
| Output: $y \leftarrow y_1 y_2 ... y_L$. | (80) |

An iterative decryption process $x=RC4C_{S(k)}^{-1}(y)$ in accordance with the second embodiment of the fifth example is given by:

| | |
|---|---|
| Initialization: S = S(k), i = j = 0, and $y_0$ = 0 | (81) |
| For l=1, 2, ..., L: | (82) |
| $\quad y \leftarrow y_{l-1}$ | (83) |
| $\quad$ Repeat until $z < N - N \mod N_l$ and (z = 0 or gcd(z, $N_l$) = 1) | (84) |
| $\quad\quad i \leftarrow i + 1$ | (85) |
| $\quad\quad j \leftarrow j + S[i] + y$ | (86) |
| $\quad\quad$ Swap S[i] and S[j] | (87) |
| $\quad\quad z \leftarrow S[S[i] + S[j]]$ | (88) |
| $\quad\quad y \leftarrow 0$ | (89) |
| $\quad z_l \leftarrow z$ | (90) |
| Output: $z \leftarrow z_1 z_2 ... z_L$ | (91) |
| For l=L, L-1, ..., 1: | (92) |
| $\quad x \leftarrow y_l$ | (93) |
| $\quad$ Repeat until $y_1 y_2 ... y_{l-1} x x_{l+1} x_{l+2} ... x_L$ is syntax compliant | (94) |
| $\quad\quad x \leftarrow (x - z_l) \mod N_l$ | (95) |
| $\quad x_l \leftarrow x$ | (96) |
| Output: $x \leftarrow x_1 x_2 ... x_L$. | (97) |

With reference the fourth example, with at least three rounds, it can be implemented by using the above indicated expressions concerning the RC4 type cipher. The three-round encryption process $y=E_k(x)$ is defined on the basis of the one-round encryption process with plaintext or ciphertext memory, $y=RC4P_{S(k,r)}(x)$ or $y=RC4C_{S(k,r)}(x)$, in the same way as for a generic stream cipher with plaintext or ciphertext memory, respectively, where an initialization algorithm is needed to generate the initial permutation S(k,r) as a function of the secret key k and the round number r. In particular, S(k,r) may depend only on k, i.e., S(k,r)=S(k).

The well-known initialization algorithm of RC4, which maps any sequence of N integers from [0, N−1] (defined by the secret key) into an initial permutation may be utilized for initialization. Let $k=k_0 k_1 ... k_{N-1}$ be a key input sequence to the initialization algorithm, which is defined in terms of the secret key k and the round number r as a sequence of N integers from [0, N−1].

In particular, k can be defined by representing k as a sequence of integers from [0, N−1], by concatenating k and r, and by repeating this concatenation as many times as needed (possibly only partially at the end) to obtain k. If S(k,r) does not depend on r, then k is composed of k only. However, instead of using the well-known initialization algorithm of RC4 to obtain S(k,r) as a function of k, a more secure algorithm is proposed according to another aspect of the present invention, with the objective of rendering the secret-key reconstruction attacks even less feasible, especially in the related-key scenario. The input to the initialization algorithm is the key sequence k and the output is the initial permutation S(k), i.e., S(k,r), since k is determined by k and r.

| |
|---|
| Initialization: S[i] = i, $0 \leq i \leq N-1$, and j = 0 |
| For i=0, 1, ..., N−1 |
| $\quad j \leftarrow j + S[i] + k_i$ |
| $\quad$ Swap S[i] and S[j] |
| For i=0, 1, ..., N−1 |
| $\quad j \leftarrow j + S[i]$ |
| $\quad$ Swap S[i] and S[j] |
| $\quad z_i \leftarrow S[S[i] + S[j]]$ |
| Output: $z \leftarrow z_0 z_1 ... z_{N-1}$ |
| Reinitialization: S[i] = i, $0 \leq i \leq N-1$, and j = 0 |
| For i=0, 1, ..., N−1 |
| $\quad j \leftarrow j + S[i] + z_i$ |
| $\quad$ Swap S[i] and S[j] |
| Output: S(k) ← S. |

The Applicant observes that the above described fifth example employing three-round encryption process based on a generic stream cipher with plaintext or ciphertext memory is expected to be secure in the ECB mode of operation if the underlying stream cipher is secure. In any case, any attack on the three-round encryption process would reveal a weakness of the underlying stream cipher. If needed, the security level can be increased by using more than three rounds. If RC4 is used as the stream cipher, then the corresponding three-round encryption process with plaintext or ciphertext memory is estimated to be secure even if the round processes all have the same initial permutation.

The known, potentially detectable statistical weaknesses of the RC4 keystream sequence are prevented by using three rounds, by making the j pointer dependent on the plaintext or ciphertext, and by additional clocking ensuring the uniform distribution of the keystream symbols with respect to a reduced modulus for modular addition of plaintext and keystream symbols.

The existing secret key reconstruction attacks on the RC4 keystream generator have a very high complexity for moderately large modulus N (e.g., for N≥64) and as such do not result in practical attacks. However, they are estimated not to be applicable to the proposed three-round encryption process due to a different structure consisting of three rounds and having the j pointer dependent on the plaintext or ciphertext.

The invention claimed is:

1. A symmetric-key encryption method of transforming a sequence of plaintext symbols into a sequence of ciphertext symbols, comprising an iterative encryption process, comprising:
   computing an altered current internal state by combining a current internal state with a current memory symbol;
   computing a next internal state from said altered current internal state;
   generating an intermediate keystream symbol from said next internal state;
   verifying whether said intermediate keystream symbol satisfies a condition related to data-format/syntax rules;
   while said condition is not satisfied, repeatedly computing said next internal state and repeatedly generating another intermediate keystream symbol until said condition is satisfied so to define a next keystream symbol which satisfies said condition; and
   encrypting a next plaintext symbol into the next of ciphertext symbol by employing the next keystream symbol.

2. The encryption method of claim 1, further comprising: defining an initial internal state from a secret key by applying an initialization algorithm.

3. The encryption method of claim 1, wherein:
   computing said next internal state from said altered current internal state comprises applying a next state function to said altered current internal state; and
   generating said intermediate keystream symbol from said next internal state comprises applying an output function to said next internal state.

4. The encryption method of claim 1, wherein encrypting said next plaintext symbol comprises combining the next plaintext symbol with the next keystream symbol into the next ciphertext symbol by employing a reversible function, wherein data formats of said next ciphertext symbol and said next plaintext symbol are the same.

5. The encryption method of claim 4, wherein encrypting said next plaintext symbol is an iteration process comprising a plurality of iterations; each iteration comprising:
   performing a combination of an intermediate plaintext symbol with the next keystream symbol into an intermediate ciphertext symbol by employing a reversible function, wherein said intermediate plaintext symbol is equal to said next plaintext symbol, in a first iteration, and to said intermediate ciphertext symbol from the preceding iteration, in subsequent iterations;
   verifying whether a data sequence comprising previously generated ciphertext symbols, said intermediate ciphertext symbol, and subsequent plaintext symbols satisfies syntax rules;
   repeating, while said syntax rules are not satisfied, the combination of said intermediate plaintext symbol with the next keystream symbol into the intermediate ciphertext symbol until the syntax rules are satisfied; and
   stopping the iteration process when the syntax rules are satisfied and outputting a last intermediate ciphertext symbol as the next ciphertext symbol.

6. The encryption method of claim 5, wherein verifying whether said data sequence satisfies syntax rules comprises employing one of the following techniques: a Turing machine, a finite-state automaton, and a finite-input-memory automaton.

7. The encryption method of claim 6, wherein verifying the syntax rules by a finite-input-memory automaton comprises:
   comparing said intermediate ciphertext symbol with permissible values stored in a lookup table, depending on preceding ciphertext symbols and subsequent plaintext symbols.

8. The encryption method of claim 1, wherein said current memory symbol employed to compute the altered current internal state is a current plaintext symbol.

9. The encryption method of claim 1, wherein said current memory symbol employed to compute the altered current internal state is a current ciphertext symbol.

10. The encryption method of claim 1, further comprising:
    reversing symbols order of the sequence of ciphertext symbols obtaining a reversed sequence;
    applying said iterative encryption process to the reversed sequence to be encrypted so as to generate a further intermediate sequence of ciphertext symbols; and
    iteratively reversing symbols order of ciphertext symbols and applying the iterative encryption process until the syntax rules are satisfied.

11. The encryption method of claim 10, wherein applying reversing symbols order and encryption process is repeated at least three times.

12. The encryption method of claim 11, wherein the encryption method is in accordance with an Electronic Code Book mode of operation.

13. The encryption method of claim 1, wherein encrypting the next plaintext symbol into the next ciphertext symbol by employing the next keystream symbol comprises modular arithmetic processing.

14. The encryption method of claim 1, wherein computing an altered current internal state by combining a current internal state with a current memory symbol comprises:
    defining said current internal state and said current memory symbol as binary vectors; and
    employing a combining operation of said current memory symbol and a sub-vector of said current internal state.

15. The encryption method of claim 14, wherein said combining operation is a bitwise binary addition of said current memory symbol and a sub-vector of said current internal state.

16. The encryption method of claim 1, wherein a condition related to data-format/syntax rules comprises verifying that an l-th keystream symbol $z_l$, is smaller than $N-N \mod N_l$, wherein:
    N defines a range $[0, N-1]$ of values of keystream symbols; and $N_l$ defines another range $[0, N_l-1]$ of values of an l-th plaintext symbol.

17. The encryption method of claim 1, wherein said condition related to data-format/syntax rules for an l-th plaintext symbol further comprises verifying whether an l-th keystream symbol $z_l$, is equal to 0 or $gcd(z_l, N_l)=1$, where gcd denotes the greatest common divisor.

18. The encryption method of claim 17, wherein an iterative encryption process is performed in one step, by determining a minimum number of iterations by employing an extended Euclidean algorithm.

19. The encryption method of claim 1, wherein said next-state and output functions are derived from an RC4 keystream generator, said encrypting a next plaintext symbol into a next ciphertext symbol is performed by modular addition, and said computing an altered current internal state is performed by modular addition of said symbol and an updated j-pointer from an RC4 internal state.

20. A symmetric-key encryption system for transforming a sequence of plaintext symbols into a sequence of ciphertext symbols, comprising first communication equipment comprising a memory storing a computer program, the computer program comprising:
   a first computing module configured to compute an altered current internal state by combining a current internal state with a current memory symbol;
   a second computing module configured to compute a next internal state from said altered current internal state;
   a generation module configured to generate a keystream symbol from said next internal state;
   a verification module configured to verify whether said generated keystream symbol satisfies a condition related to data-format/syntax rules, wherein the system is configured to, while said condition is not satisfied, repeatedly compute said next internal state and repeatedly generate another keystream symbols until said condition is satisfied so to define a next keystream symbol which satisfies said condition; and
   a symbol encryption module configured to iteratively encrypt a plaintext symbol by employing the next keystream symbol to obtain the sequence of ciphertext symbols.

21. The symmetric-key encryption system of claim 20, further comprising:
   a communication network connected to the first communication equipment;
   a second communication equipment connected to a network to receive a sequence of ciphertext symbols and comprising:
      a key generation module configured to generate keystream symbols from a secret key received by the first communication equipment; and
      a decryption module configured to process the keystream symbols and the sequence of ciphertext symbols and provide a corresponding sequence of plaintext symbols.

* * * * *